United States Patent Office 3,419,387
Patented Dec. 31, 1968

3,419,387
PROCESS OF MAKING HIGH LOADED UO₂-COLUMBIUM CERMETS
Emanuel Gordon, New Haven, Conn., and Nathan Fuhrman, Shrub Oak, N.Y., assignors to the United States of America as represented by the United States Atomic Energy Commission
Filed July 24, 1967, Ser. No. 656,986
3 Claims. (Cl. 75—206)

ABSTRACT OF THE DISCLOSURE

A process for producing $UO_2$-columbium cermets having ceramic phase loadings of over 70 volume percent, comprising coating $UO_2$ spheres sequentially with wax, then with columbium powder, applying a pressure to the coated spheres to form a compact, heating the compact to a temperature of less than 900° C. to dewax the compact, thereafter heat sintering the compact.

BACKGROUND OF THE INVENTION

The invention described herein was made in the course of, or under a contract with the U.S. Atomic Energy Commission.

Fast reactor design studies have shown the need for a nuclear fuel having a high uranium density in the form of a cermet. The principle route employed by other workers in the field was to hot isostatically press columbium coated high density uranium dioxide spheres. This process, however, is relatively complex and costly.

Some efforts have been made to employ the more economical and conventional powder metallurgical route of compacting and sintering at 1700° C. high fired (dense) uranium dioxide spheres and columbium powder blends, however, no densification essentially occurred.

The prior art compacting and sintering has been unable to produce dense uranium dioxide-columbium cermets having a $UO_2$ loading greater than 60 volume percent.

SUMMARY OF THE INVENTION

We have discovered a method for producing uranium dioxide-columbium cermets having $UO_2$ loadings of greater than 70 volume percent uranium dioxide, with the balance consisting of columbium, comprising applying a uniform wax coating to the surface of uranium dioxide spheres, the uranium dioxide spheres having a density ranging from about 55 percent to about 74 percent of theoretical and a diameter ranging from about 80 microns to about 250 microns; applying a uniform coating of from about 19.5 to about 33.5 weight percent of particulate columbium based on the weight of uranium dioxide employed to the wax coated spheres, the particulate columbium having a particle size of less than 10 microns; isostatically applying a pressure of greater than 20 tons per square inch to the columbium coated spheres to form a compact of the spheres; heating the compact under an inert atmosphere such as argon or vacuum to a temperature of less than 900° C. to dewax the compact, thereafter heating the dewaxed compact under an inert atmosphere at a temperature ranging from about 2100° C. to about 2300° C. to sinter the compact. It is an object of this invention to produce uranium dioxide-columbium cermets having uranium dioxide loadings of greater than 70 volume percent uranium dioxide.

DESCRIPTION OF THE PREFERRED EMBODIMENT

Figure 1:
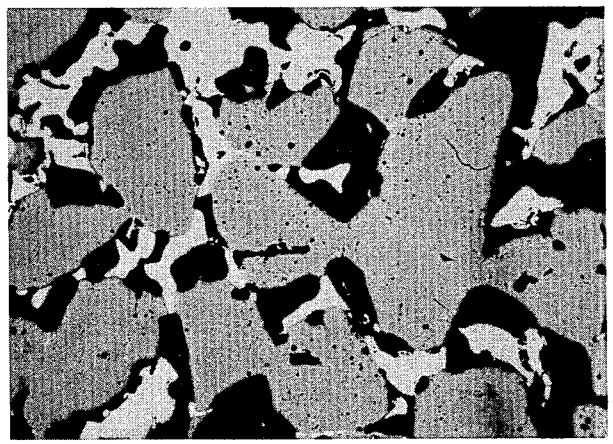
FIGURE 1 is a photomicrograph of $UO_2$-columbium cermet which was made in accordance with our process, except that $UO_2$ particles having a theoretical density of 93 percent were employed in the preparation of the cermet. The dark areas in the photomicrograph are evidence of the extensive void spaces which result when excessively dense $UO_2$ particles are employed in the practice of our invention.

When uranium dioxide spheres having a density of over 74 percent of theoretical are employed in the practice of our invention, one cannot obtain the desired high density cermet body. Uranium dioxide spheres having a density of less than 55 percent of theoretical are too fragile to process. In the preferred embodiment of our invention, we use uranium dioxide spheres having a density ranging from 60 percent to 70 percent of theoretical. The uranium dioxide spheres found usable in our invention can readily be prepared by techniques well known to those skilled in the art and they are commercially available. In the preferred embodiment of our invention we employ a sharp fraction of uranium dioxide spheres having a narrow size range of from 100 to 150 microns.

The wax may be applied to the uranium dioxide spheres merely to provide a removable adhesive to allow the particulate columbium to adhere to the $UO_2$ spheres. The amount of wax to be employed is not critical, since the wax is removed from the product in a subsequent step in the process. In general we employ an amount of wax ranging from about 0.15 to about 3 weight percent based on the total weight of the uranium dioxide spheres employed. The amount of wax to be used will of course be directly related to the degree of porosity of the $UO_2$ spheres. To apply the wax to the spheres all that is necessary is to dissolve the wax in a solvent such as benzene and to mix the $UO_2$ spheres in the solution, thereafter, the benzene is removed from the mixture by evaporation, thus producing the desired wax-coated spheres.

The wax-coated spheres are then blended (tumbled) with the particulate columbium to coat the columbium onto the wax-coated $UO_2$ spheres. This method of introducing the metal phase (applying coating) is well known to those skilled in the art as the "sticky ball method of coating".

The weight of the particulate columbium coated on the spheres can range from 19.5 to about 33.5 weight percent based on the total weight of the $UO_2$ contained in the spheres corresponding to 80 v/o and 70 v/o $UO_2$ loadings, respectively.

The columbium coated spheres can then be shaped into a fuel element cermet by subjecting them in a mold to an isostatic pressure of greater than 20 tons per square inch. The pressures employed permit the formation of a strong green compact and aid in the elimination of void spaces in the pressed structure, thus assisting in achieving the high density of the final product.

The use of the wax binder necessitates a furnace operation for its removal from the green compacts prior to sintering. This is easily accomplished by heating the wax-containing green compacts under an inert atmosphere, such as argon, or a vacuum, to a temperature of less than 900° C. till the wax is removed. The temperature pressure conditions should be sufficient to remove the wax.

The dewaxed compacts are then sintered by heating them at a temperature ranging from about 2100° C. to 2300° C. under an inert atmosphere, e.g., helium. In the preferred embodiment of our invention we employ a temperature of about 2200° C. during the sintering operation.

Example 36.41 grams of porous spheroidal $UO_2$ particles having a particle size ranging from 105 microns to 147 microns and a density of 67 percent of theoretical were mixed with a solution composed of 1.03 grams of paraffin and 7 ml. benzene. The benzene was evaporated from the mixture and the wax-coated $UO_2$ spheres were passed through a 60 mesh screen (U.S. Standard) to separate some clumps of particles which had formed.

The wax coated spheres were blended (tumbled) in a container with 7.09 grams of particulate columbium, which had a particle size of less than 10 microns, until substantially all of columbium powder was uniformly coated onto the wax-coated spheres.

The columbium coated spheres were then preformed into a cylindrical compact having a diameter of 0.502 inch, by subjecting them to a die pressing at a pressure of about 2 tons per square inch. Thereafter, the preformed compacts were isostatically pressed in a rubber mold with an isostatic pressure of 30 tons per square inch to produce a cylindrical shape having a diameter of 0.444 inch, a length of 2.5 inches and a weight of 44.2 grams.

Figure 2:
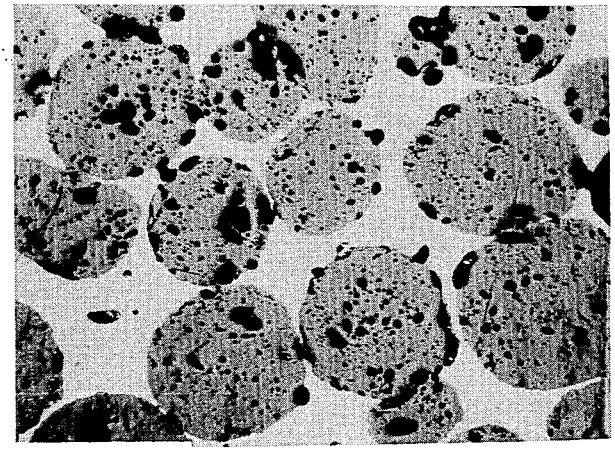
FIGURE 2 is a photomicrograph of a typical cermet made in accordance with our invention.

Thereafter, the green compact was dewaxed by heating it to a temperature of 500° C. under a vacuum until all the wax was removed from the compact. The dewaxed compact was then sintered by heating it to a temperature of 2200° C. for six hours under a helium atmosphere. The sintered compact was cylindrically shaped having a diameter of 0.393 inch, a length of 2.24 inches, a weight of 43.3 grams, a density of 9.56 grams/cc. and a theoretical density of 91.3 percent. FIGURE 2 is a photomicrograph of the cermet prepared in this example.

We claim:
1. A process for producing dense uranium dioxide-columbium cermets, said cermets having a high $UO_2$ loading comprising:
   (a) applying a wax coating to the surface of uranium dioxide spheres, the uranium dioxide spheres having a theoretical density ranging from about 55 percent to about 74 percent and a diameter ranging from about 80 microns to about 250 microns;
   (b) applying a coating of from about 19.5 to about 33.5 weight percent of particulate columbium based on the weight of uranium dioxide employed to the wax coated spheres, the particles of said columbium having a particle size of less than 10 microns;
   (c) isostatically applying a pressure greater than 20 tons per square inch to the columbium coated spheres to form a compact of the columbium coated spheres;
   (d) heating the compact in an inert atmosphere to a temperature of less than 900° C. to dewax the compact;
   (e) heating the dewaxed compact to a temperature ranging from 2100° C. to 2300° C. in an inert atmosphere to sinter the compact.

2. The process of claim 1 wherein said uranium dioxide spheres have a theoretical density of 67 percent.

3. The process of claim 2 wherein the dewaxed compact is heated at a temperature of 2200° C. in a helium atmosphere to sinter the compact.

References Cited

UNITED STATES PATENTS

| | | | |
|---|---|---|---|
| 1,566,793 | 12/1925 | Gero | 75—212 |
| 2,689,808 | 9/1954 | Clayton. | |
| 3,066,391 | 12/1962 | Vordahl | 75—212 |
| 3,088,892 | 5/1963 | Cain et al. | |
| 3,145,183 | 8/1964 | Fisher | 117—109 X |
| 3,173,973 | 3/1965 | Brockway | 117—109 |
| 3,276,867 | 10/1966 | Brite et al. | 75—206 |
| 3,318,695 | 5/1967 | Goslee et al. | 75—212 |
| 3,344,211 | 9/1967 | Redding et al. | 117—109 X |

FOREIGN PATENTS

| | | |
|---|---|---|
| 1,031,678 | 6/1966 | Great Britain. |
| 1,054,116 | 1/1967 | Great Britain. |
| 639,086 | 4/1964 | Belgium. |
| 640,634 | 5/1965 | Belgium. |

BENJAMIN R. PADGETT, *Primary Examiner.*

R. L. GRUDZIECKI, *Assistant Examiner.*

U.S. Cl. X.R.

75—212; 264—.5; 117—71, 109